United States Patent
Magoulick et al.

(12) 
(10) Patent No.: US 6,238,744 B1
(45) Date of Patent: May 29, 2001

(54) METHOD FOR ELIMINATING BEARING ASSEMBLY HOOT NOISE

(75) Inventors: Thomas Magoulick, Livonia; Vemulapalli Durga Nageswar Rao, Bloomfield Township, both of MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/464,376

(22) Filed: Dec. 15, 1999

Related U.S. Application Data

(63) Continuation-in-part of application No. 09/024,445, filed on Feb. 17, 1998, now abandoned.

(51) Int. Cl.$^7$ ............................ B05D 3/12; B05D 3/02; B05D 1/38; F16C 33/00
(52) U.S. Cl. .................. 427/369; 427/181; 427/203; 427/236; 427/388.1; 427/409; 427/419.7; 427/421; 384/463; 384/625; 384/913
(58) Field of Search ......................... 427/181, 203, 427/205, 236, 388.1, 409, 419.7, 421, 369; 384/322, 463, 625, 907, 910, 913

(56) References Cited

U.S. PATENT DOCUMENTS

| | | | |
|---|---|---|---|
| 2,969,264 | * 1/1961 | Lamson et al. | 308/187 |
| 3,936,295 | 2/1976 | Cromwell et al. | 75/5 R |
| 4,204,886 | 5/1980 | Bens | 148/15.5 |
| 4,511,606 | * 4/1985 | Ehrlich et al. | 427/386 |
| 5,066,145 | 11/1991 | Sibley et al. | 384/463 |
| 5,230,570 | * 7/1993 | Bursey, Jr. et al. | 384/527 |
| 5,271,679 | 12/1993 | Yamazumi et al. | 384/527 |
| 5,421,788 | * 6/1995 | Toth | 427/135 |
| 5,449,237 | 9/1995 | Seo | 384/448 |
| 5,482,637 | * 1/1996 | Rao et al. | 252/29 |
| 5,549,398 | 8/1996 | Van Brakel et al. | 384/571 |
| 5,640,769 | * 6/1997 | Suzuki et al. | 29/898.067 |

* cited by examiner

*Primary Examiner*—Shrive Beck
*Assistant Examiner*—Michael Barr
(74) *Attorney, Agent, or Firm*—Roger L. May; Damian Porcari

(57) ABSTRACT

A method for eliminating hoot noise in a bearing assembly (12) of an idler or tensioner pulley (10) includes applying a three component dry lubricating compound onto steel contact surfaces of the inner and outer raceways (14, 16) on which the ball bearings (20) ride, curing the compound to bond it to the contact surfaces, and pressure rolling the lubricating compound onto the surfaces. Pressure rolling fills voids (22) in the contact surfaces with particles of the lubricating compound and smoothes the surfaces thereby reducing friction. The dry lubricating compound has a very strong affinity for oil to attract and hold oil to provide an oil film which prevents metal to metal contact thereby eliminating hoot noise.

20 Claims, 1 Drawing Sheet

METHOD FOR ELIMINATING BEARING ASSEMBLY HOOT NOISE

CROSS-REFERENCE TO RELATED APPLICATIONS

This application is a continuation-in-part of application Ser. No. 09/024,445 filed Feb. 17, 1998, now abandoned.

TECHNICAL FIELD OF THE INVENTION

The present invention relates generally to vehicle noises, and, more particularly, to a method for reducing an objectionable whining noise sometimes present at vehicle startup referred to as hoot.

BACKGROUND OF THE INVENTION

In vehicle front end accessory drive systems, idler pulleys with ball bearings are used to route a drive belt for improved wrap on accessory pulleys and to reduce drive belt span lengths. Similar pulleys with ball bearings are also used in tensioners for maintaining the proper belt tension. Both are subject to the same problem. During cold starts at temperatures below about 20° F., the pulleys sometimes produce an objectionable whining noise called hoot that lasts for about five to thirty seconds. Noises coming from the engine area can be very alarming to vehicle owners, particularly those who are mechanically challenged or uninformed about various sounds associated with engine and vehicle operation. The hoot only occurs during cold startup and is attributed to a lack of lubrication at the bearing contacting surfaces; namely, the interaction between the rolling balls, the inner raceway and the outer raceway. Accordingly, it will be appreciated that it would be highly desirable to have a method for lubricating the idler bearings so that the bearings remain lubricated at cold startup to eliminate the hoot noise.

Bearing assemblies have conventionally had contact surfaces coated to prevent rust, reduce friction or increase wear resistance. The rust preventive coating process is a complicated process requiring a phosphatized film. The process for increasing wear resistance uses plasma spray coating which requires special plasma equipment. One friction reducing process coats roller bearings with a lubricating paint that is insoluble in oil, but the paint requires time to dry and erodes quickly. Another friction reducing process uses bronze or molybdenum applied by thermal spraying. Unfortunately, the coating erodes during use; so, multiple layers in different colors must be used to gauge wear. Bearing assemblies have conventionally used coatings and coating processes that increase manufacturing time or are complicated requiring multiple coatings or numerous manufacturing steps to accomplish. It is desirable to permanently coat bearing surfaces to reduce friction and eliminate hoot using a relatively simple, inexpensive process.

SUMMARY OF THE INVENTION

The present invention is directed to overcoming one or more of the problems set forth above. Briefly summarized, according to one aspect of the present invention, a method for eliminating hoot noise in a bearing assembly of an idler or tensioner pulley having ball bearings riding on inner and outer raceways, comprises the steps of: applying a dry lubricating compound to surfaces of the inner and outer raceways on which the ball bearing rides and curing the dry lubricant. This in turn allows the following actions judged favorable to eliminate hoot. Oil is attracted to the contact surfaces which itself is a desirable outcome. The particles of the lubricating compound are rolled into the surfaces of the raceways through normal operation effectively changing the surfaces to an alloy containing the metal, dry lubricant particles and oil. These in turn fill voids in the surfaces thereby smoothing the surfaces for reduced friction and elimination of the hoot noise.

Using a three component dry lubricating compound instead of grease or in combination with grease ensures better performance than grease alone, especially at low operating temperatures where grease is too viscous and at high operating temperatures where grease is too thin. The dry lubricant is as easily applied as paint and does not require the use of expensive or complicated equipment. It is more cost effective than polishing the raceways to a high polish finish to achieve low friction. It allows the use of less costly and more durable bearing materials with less need for precise machined tolerances.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
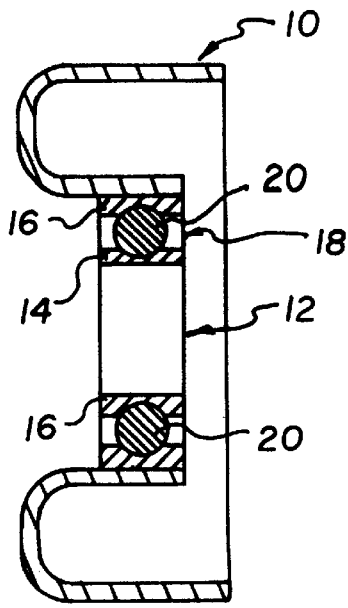
FIG. 1 is a diagrammatic cross-sectional view of an idler and bearing assembly showing the bearing surfaces affected by a dry lubricant according to the present invention.
Figure 2:
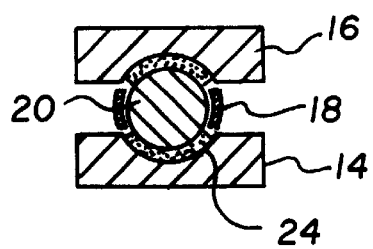
FIG. 2 is a somewhat enlarged cross-sectional view of the inner and outer raceways and a ball bearing of the idler and bearing assembly of FIG. 1 with the ball bearing riding in the raceways.
Figure 3:
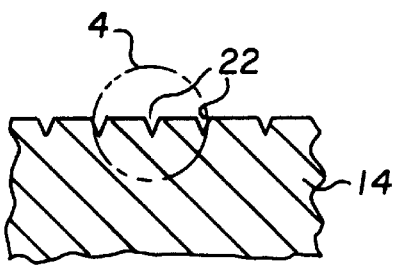
FIG. 3 is a diagrammatic sectional view of a raceway showing surface voids.
Figure 4:
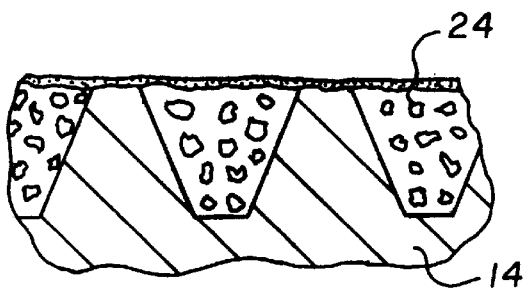
FIG. 4 is the raceway of FIG. 3 with the voids filled according to the present invention.

Referring to FIGS. 1–4, an idler or tensioner pulley 10 has a bearing assembly 12 on which the pulley 10 rotates. Bearing assembly 12 includes inner and outer raceways 14, 16 and a ball cage assembly 18 between them that rides in the raceways. The ball cage assembly 18 contains a plurality of ball bearings 20. The ball bearings and raceways are typically constructed of steel with contact surfaces machined smooth to produce low coefficients of friction and low friction. Machining still leaves minor surface imperfections and voids 22 that are a source of friction. Smoothness is a quality of surface uniformity resulting from a lack of surface imperfections and voids. Asperity height is a term that can be used as a measure of surface smoothness. Asperity height is the distance from the top to the bottom of a surface imperfection or void. The lower the asperity height, the smoother the surface. Lubricating grease is used to further reduce friction, minimize noise and reduce metal to metal contact during operation by creating an oil film on the surfaces that separate the components. Unfortunately, at low temperatures on the order of 20° F. or so, the lubricant can be insufficient to prevent a complex set of conditions which can lead to the hoot noise. The exact nature of hoot is not defined but is believed to be related to inadequate lubrication. Inadequate lubrication leads to metal to metal contact in the bearing and ultimately hoot. Laboratory experiments confirm that increasing lubrication eliminates hoot noise.

A method for eliminating hoot noise includes applying a dry lubricating compound to surfaces of the inner and outer raceways 14, 16 on which the ball bearings 20 ride. The dry lubricant is bonded to the bearing surfaces or is capable of being bonded through rolling contact on the affected surfaces of the bearing components. The dry lubricant is composed of a polymer containing molybdenum disulfide, $MoS_2$, graphite and boron nitride, BN, such a compound is more fully discussed in U.S. Pat. No. 5,482,637, the disclosure of which is incorporated herein by reference. This dry lubricant formulation, particularly due to Molybdenum disulfide, $MoS_2$, has a strong affinity for oil so that it enhances lubrication in a bearing assembly where grease is used.

The dry lubricating compound may use tungsten disulfide, $WS_2$, or lithium fluoride, LiF, instead of, $MoS_2$ or BN, or may use , $WS_2$ or LiF, in combination with $MoS_2$ or BN. While tungsten disulfide is a very hard substance and is a solid film lubricant, it is oil phobic, similar to TEFLON. While very low friction is obtained with tungsten disulfide, noise attenuation in the oil starved condition is inferior to Molybdenum disulfide because it is oil phobic and does not hold a tenacious oil film as Molybdenum disulfide does.

The dry lubricating compound has a strong affinity for attracting oil which enhances lubrication in the bearing assembly, particularly at temperatures where grease is ineffective. In addition, after the compound is coated onto one or more of the contacting surfaces, that is, during normal operation, particles from the compound are rolled into the surface voids of the raceways and balls, infused in place by the heat generated from friction and the contact pressure, effectively changing the surface to a steel alloy.

The lubricating compound is preferably sprayed like paint onto the bearing surfaces or applied like paint using other processes. The lubricating compound is applied in a thin layer and cured forming a hard, dry lubricant coating. Ideally, the lubricant is applied to a thickness of about 8 microns, but thicker coatings can be used on the order of a millimeter. After the surfaces are coated with the lubricating compound, it is cured by heating for about 20 to 45 minutes between about 315° F. to 375° F. Lower temperatures near 315° F. are preferred for a duration near 45 minutes so that the metal raceways do not anneal.

After curing, particles of the lubricating compound are rolled onto the surfaces of the raceways fusing the surface disparities and effectively changing the surfaces to steel alloys. Rolling can be accomplished at the time of manufacture or can occur during use as the ball bearings ride in the raceways. Curing bonds the compound to the metal components and rolling fills voids in the surfaces with the particles of the cured compound and smoothes the surfaces thereby reducing the coefficient of friction.

When using the dry lubricant, the step of polishing the bearing contact surfaces to a high finish can be eliminated because particles of the dry lubricant fills voids creating a smooth surface. The quantity of grease required to lubricate the bearing can be greatly reduced. In some instances, grease may be eliminated entirely along with grease seals thereby reducing the complexity of the bearing assembly as well as reducing manufacturing time and cost.

By filling surface voids, the asperity height is reduced which reduces friction. While friction is reduction is extremely important, an adherent oil film is even more important for noise attenuation in the case of rubbing surfaces that function at a non-constant speed. A typical example is that of two very highly polished, high hardness, steel surfaces (0.001 Micron Ra, —cf. mirror finish) which yields a very low friction coefficient. However, in an oil starved condition, because of the lack of an oil film, metal to metal contact occurs and noise attenuation fails causing hoot noise to prevail. Thus, even with the lowest friction, hoot noise can occur where there is a lack of oil lubrication.

After rolling, the asperity height is reduced to about 0.05 to 0.06 microns while the oil film supported is on the order of 0.5 microns. It has been found that when the ratio of oil film thickness to asperity height is greater than about six, there is no metal to metal contact; hence, no hoot noise. On the other hand, ratios less than six allow metal to metal contact and consequently noise. The dry lubricant compound has a very strong affinity for oil so that a sufficient oil film is maintained, even at cold startup conditions. Even though reducing friction by increasing surface smoothness reduces noise, there must be an oil film to eliminate metal to metal contact and to eliminate hoot noise.

It can now be appreciated that a method for eliminating hoot noise in a bearing assembly of a pulley has been presented. The method includes applying a dry lubricating compound containing three lubricants which attract and hold oil and can be rolled to fill voids in the bearing surfaces for reducing friction. Using a three component dry lubricating compound instead of grease or in combination with grease ensures better performance than grease alone. At low operating temperatures grease is too viscous to flow readily to provide lubrication needed to eliminate noise, and at high operating temperatures grease is too thin to maintain the oil film needed for lubrication and noise reduction. The dry lubricant is as easily applied as paint and does not require the use of expensive or complicated equipment. It is easily cured by heating at relatively low temperatures for a short period of time.

With the present invention, the raceways can be constructed of steel with the contact surfaces made smooth when they are coated and rolled with the dry lubricant. This is more cost effective than coating the surfaces with nickel or bronze, or polishing the raceways to a high polish finish to achieve low friction. The present invention allows the use of less costly and more durable bearing materials with less need for precise machined tolerances.

As is evident from the foregoing description, certain aspects of the invention are not limited to the particular details of the examples illustrated. For example, the dry lubricant can be bonded to the ball cage which in turn is rolled onto the balls and then the raceways. The concept can be used on other types of bearings such as roller bearings. It is therefore contemplated that other modifications and applications will occur to those skilled in the art. It is accordingly intended that the claims shall cover all such modifications and applications as do not depart from the true spirit and scope of the invention.

What is claimed is:

1. A method for eliminating hoot noise in a bearing assembly of a pulley of a front end accessory drive system of a vehicle, said bearing assembly having a ball bearing riding on inner and outer raceways, the method comprising the steps of:

applying a dry lubricating compound having an affinity for oil and containing a curable polymer to surfaces of the inner and outer raceways on which the ball bearing rides;

curing said dry lubricating compound and bonding said dry lubricating compound to said surfaces of the inner and outer raceways to thereby attract oil to said surfaces; and pressure rolling said dry lubricating compound onto said surfaces and filling voids in said surfaces with said dry lubricating compound and smoothing said surfaces to a preselected asperity height, said dry lubricant holding oil at said surfaces at a predetermined film thickness so that the ratio of film thickness to asperity height is at least six whereby metal to metal contact is avoided and hoot noise emanating from the bearing assembly of the vehicle is eliminated.

2. The method of claim 1 wherein the dry lubricating compound contains molybdenum disulfide, graphite and boron nitride.

3. The method of claim 1 wherein the dry lubricating compound contains tungsten disulfide, graphite and lithium fluoride.

4. The method of claim 1 wherein the dry lubricating compound contains three dry lubricants selected from a group containing graphite, molybdenum disulfide, tungsten disulfide, boron nitride and lithium fluoride.

5. The method of claim 1 wherein the step of applying a dry lubricating compound includes applying said dry lubricating compound to a thickness of about eight microns.

6. The method of claim 1 wherein the step of curing said dry lubricating compound and bonding said dry lubricating compound to said surfaces of the inner and outer raceways includes heating said compound and surfaces at a temperature in a range of about 315° F. to 375° F.

7. The method of claim 6 wherein the step of heating said compound and surfaces includes heating for a period of time in a range of about 20 to 45 minutes.

8. The method of claim 1 wherein the step of pressure rolling said dry lubricating compound includes rolling at a pressure at least equal to the pressure exerted on said surfaces by said ball bearing as said ball bearing rides in said raceways during operation.

9. The method of claim 1 wherein said asperity height is in a range of about 0.05 microns to about 0.06 microns after pressure rolling.

10. The method of claim 1 wherein said film thickness of said oil is about 0.5 microns.

11. A method for eliminating hoot noise in a bearing assembly of idler and tensioner pulleys of a vehicle, said bearing assembly having a cage containing steel ball bearings riding on steel surfaces of inner and outer raceways, the method comprising the steps of:

applying a dry lubricating compound having an affinity for oil and containing a curable polymer to the steel surfaces of the inner and outer raceways on which the ball bearings ride;

heating said dry lubricating compound and said steel surfaces and bonding said dry lubricating compound to said steel surfaces of the inner and outer raceways thereby attracting and holding oil at said surfaces; and pressure rolling said dry lubricating compound onto said steel surfaces of the inner and outer raceways and filling voids in said steel surfaces with particles of said dry lubricating compound and smoothing said surfaces to a preselected asperity height, said dry lubricant holding oil at a predetermined film thickness so that the ratio of film thickness to asperity height is at least six whereby metal to metal contact is avoided and hoot noise emanating from the idler and tensioner pulleys of the vehicle is eliminated.

12. The method of claim 11 wherein the dry lubricating compound contains molybdenum disulfide, graphite and boron nitride.

13. The method of claim 11 wherein the dry lubricating compound contains tungsten disulfide, graphite and lithium fluoride.

14. The method of claim 11 wherein the dry lubricating compound contains three dry lubricants selected from a group containing graphite, molybdenum disulfide, tungsten disulfide, boron nitride and lithium fluoride.

15. The method of claim 11 wherein the step of applying a dry lubricating compound includes applying said dry lubricating compound to a thickness of about eight microns.

16. The method of claim 11 wherein the step of heating said dry lubricating compound and said steel surfaces of the inner and outer raceways includes heating said compound and said steel surfaces at a temperature about 315° F. for about 45 minutes.

17. The method of claim 11 wherein the step of heating said dry lubricating compound and said steel surfaces of the inner and outer raceways includes heating said compound and said steel surfaces at a temperature not greater than 375° F. for about 20 minutes.

18. The method of claim 11 wherein the step of pressure rolling said dry lubricating compound includes rolling at a pressure at least equal to the pressure exerted on said steel surfaces by said ball bearings as said ball bearings ride in said raceways during operation.

19. The method of claim 11 wherein said asperity height is in a range of about 0.05 microns to about 0.06 microns after pressure rolling.

20. A method for eliminating hoot noise in a bearing assembly of idler and tensioner pulleys of a vehicle, said bearing assembly having a cage containing steel ball bearings riding on steel surfaces of inner and outer raceways, the method comprising the steps of:

applying a dry lubricating compound dry to a thickness of about 8 microns to the steel surfaces of the inner and outer raceways on which the ball bearings ride, said dry lubricating compound having an affinity for oil and containing a curable polymer;

heating said dry lubricating compound and said steel surfaces and bonding said dry lubricating compound to said steel surfaces of the inner and outer raceways thereby attracting and holding oil at said surfaces; and pressure rolling said dry lubricating compound onto said steel surfaces of the inner and outer raceways and filling voids in said steel surfaces with said dry lubricating compound and smoothing said surfaces to an asperity height in a range of about 0.05 to about 0.06 microns, said dry lubricant holding oil at said surfaces at a predetermined film thickness so that the ratio of film thickness to asperity height is at least six whereby hoot noise emanating from the idler and tensioner pulleys of the vehicle is eliminated.

* * * * *